United States Patent [19]

Greenwood

[11] 4,304,560
[45] Dec. 8, 1981

[54] DRIVING BELTS

[75] Inventor: John Greenwood, Leeds, England

[73] Assignee: Brammer Transmissions Limited, West Yorkshire, England

[21] Appl. No.: 78,423

[22] Filed: Sep. 24, 1979

[51] Int. Cl.³ .............................................. F16G 1/24
[52] U.S. Cl. .................................. 474/241; 24/31 L; 24/221 R
[58] Field of Search ............ 474/240, 241; 24/221 R, 24/31 L

[56] References Cited

U.S. PATENT DOCUMENTS

| 1,382,888 | 6/1921 | Brammer | 474/241 |
| 2,639,622 | 5/1953 | Ginder | 474/241 |
| 2,710,544 | 6/1955 | Whittle | 474/241 |
| 2,848,901 | 8/1958 | Groff | 474/241 |
| 2,969,686 | 1/1961 | Runton | 474/241 |
| 3,375,726 | 4/1968 | Jones et al. | 474/241 |
| 3,438,063 | 4/1969 | Loston | 24/31 L |
| 4,009,620 | 3/1977 | Thompson | 474/241 |

FOREIGN PATENT DOCUMENTS

| 340065 | 12/1930 | United Kingdom | 474/241 |
| 480412 | 2/1938 | United Kingdom | 474/241 |
| 565672 | 11/1944 | United Kingdom | 474/241 |
| 714922 | 9/1954 | United Kingdom | 474/241 |
| 715510 | 9/1954 | United Kingdom | 24/31 L |
| 738988 | 10/1955 | United Kingdom | 474/241 |

Primary Examiner—C. J. Husar
Assistant Examiner—Conrad Berman
Attorney, Agent, or Firm—Reising, Ethington, Barnard, Perry & Brooks

[57] ABSTRACT

A driving belt formed from detachable, flexible, elongate links arranged in a staggered, overlapping relationship. Each link is provided with a stud which is rotatable relative to the link and has a head which is shaped to pass through perforations in other links when the head is orientated correctly relative to the perforations but not otherwise. The arrangement allows simple assembly and disassembly of the belt without any lateral distortion of the material of the links.

8 Claims, 7 Drawing Figures

DRIVING BELTS

This invention relates to driving belts composed of detachable links formed from flexible material, the links being arranged in layers or steps one upon the other. Such a driving belt is described in U.K. patent specification No. 340,065. Currently a driving belt of this type is manufactured with links made from rubberised laminated fabric, each link being joined to overlapping links by a steel stud. The links are similar to that shown in FIGS. 3 and 4 of the above-mentioned specification except that the stud is positioned close to the narrow end of the link and the perforations are located near the wider end. The belt may have, for example, three layers of links. This link-by-link construction makes the belts both flexible and adjustable.

Although one of the advantages of a driving belt as described in U.K. patent specification No. 340,065 is that the links are detachable and interchangable so that belting can be made up to any required length, the manipulations required to insert or remove one or more links are quite difficult and require a certain amount of skill on the part of the person carrying out the operation.

An object of the present invention is to provide a driving belt having the advantages of the belts described in U.K. patent specification No. 340,065 and yet being such that links may be inserted or removed more easily and quickly than the links of such known belts.

According to the present invention, there is provided a driving belt comprising detachable, flexible, elongate links arranged in a staggered, overlapping relationship, each link having attached thereto a pendant, headed stud and having, spaced from said stud, a perforation, a first link being attached to a second overlapping link by means of the stud of the first link extending through the perforation of the second link, characterised in that the head of each said stud and of each said perforation are shaped in plan to allow the stud head to pass through the perforation without substantial lateral distortion of the link only when they are correctly aligned and the stud of said first link being rotatable about its axis relative to its associated link between a position where the stud head is aligned with the perforation of said second link and a position where the stud head is not so aligned.

Thus, the present invention is particularly advantageous in the case where the material of the link is such that the link cannot be easily distorted in the lateral direction. Such distortion is necessary with the above-mentioned known belting in order to separate or connect together adjacent links. A material which has the necessary strength of flexibility in a direction out of the plane of the link is a solid woven polyester which is impregnated with polyurethane. Known drive belting made of such a material can only be assembled and disassembled with considerable difficulty. However, the lack of lateral flexibility is of no consequence in belting in accordance with the present invention and accordingly, this material is suitable for use in the invention.

Preferably, the head of each stud and each perforation is oblong in plan. More preferably, the longitudinal axis of the perforation lies along or parallel to the longitudinal axis of the link.

Belts in accordance with the present invention may have sections composed of two or more layers of links preferably three or four layers. More preferably, the stud of each link passes through perforations in both the adjacent and next succeeding links, each link having a first and a second perforation therein. The two perforations and the stud of each link are preferably spaced apart along or parallel to the longitudinal axis of the link, the first perforation being located between said stud and the second perforation. More preferably, the shank of a stud of one link passes through the first perforation of the adjacent link at a position abutting that end of the perforation closer to the stud of said adjacent link and through the second perforation of the next succeeding link at a position abutting that end of said perforation remote from said first perforation. However, the flexibility of the material of the links and the longitudinal extension of the perforations allow the shank of a stud to move to some extent in perforations through which it passes, thereby permitting the belt to adapt itself to the perimeter of a pulley over which the belt is required to work.

Preferably, the ends of each link are of different widths so that the belt is V-shaped in cross-section when in use. More preferably the sides of each link taper inwardly in a direction opposite to the pendant end of its associated stud. The stud is perferably attached to its associated link at the narrower of the ends of the link.

An embodiment of the present invention will now be described, by way of example only, and with reference to the accompanying drawings, in which.

Figure 1:
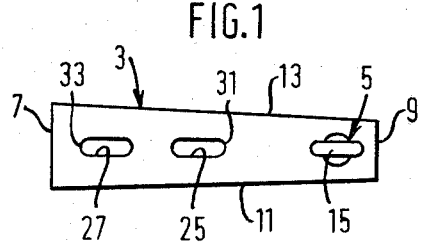
FIG. 1 is a bottom plan view of a link of belting in accordance with the present invention.

Referring to the drawings, drive belting 1 comprises a series of links 3, each link being connected to two further links by means of stud 5 so that the belts may be considered as having three layers of links.

Each link 3 comprises an elongate piece of material having parallel ends and sides which taper inwardly from one end 7 to the other end 9, The material is a solid woven polyester impregnated with polyurethane. Such material allows flexibility of the link in a direction out of the plane of the link and is shown by the arrows in FIG. 3, but substantially no flexibility or indeed stretching of material in the plane of the link. It should be emphasised that other materials can be used, for instance, the sort of rubberised laminated fabric which is currently used for known link belting.

Figure 3:
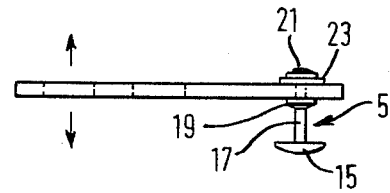
FIG. 3 is a side elevation of the link of FIG. 1.

Tapering sides 11 and 13 of link 3 are each chamfered, being inclined inwardly in a direction which is upwards with reference to FIG. 3. This assists the accommodation of the drive belting in the V-shaped groove of the pulley, although, as described in U.K. patent specification No. 340,065, it is not necessary that the chamfer angle be equal to the angle of the groove of the pulley.

Close to the narrow end 9 of the link 3, there is provided the stud 5. Stud 5 has a head 15 located at the end of shank 17 which depends downwardly (referring to FIG. 3) from the body of the link 3. Shank 17 carries a flange 19 which abuts against the lower surface of the body of link 3. Shank 17 continues above flange 19 through a hole in the body of link 3 and its upper end 21 is riveted over washer 23 which abuts the upper surface of the body of link 3. Thus stud 5 is firmly secured to the body of link 3.

As best seen in FIG. 1, the head 15 of stud 5 is oblong in plan and the significance of this will appear below.

Link 3 is perforated by two holes 25 and 27 which are located on the longitudinal axis of link 3. The shape and size of holes 25 and 27 is such as to allow the head of a stud similar to stud 5 to be a reasonably close fit within these holes.

Figure 4:
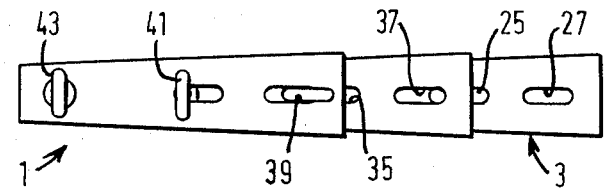
FIG. 4 is a bottom plan view of a length of belting composed of three links such as are shown in FIG. 1.
Figure 5:
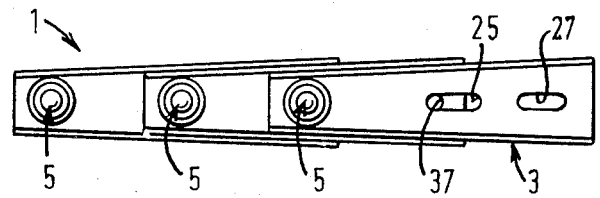
FIG. 5 is a top plan view of the length of belting of FIG. 4.
Figure 6:
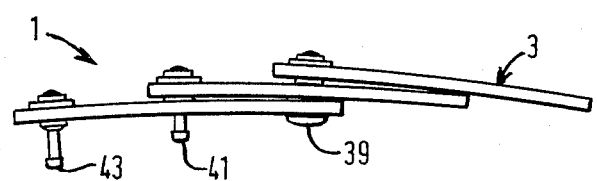
FIG. 6 is a side elevation of the length of belting of FIG. 4.

In order to assemble a belt from links 3, a first link is taken and the stud of a second link is then pushed through perforation 25 of the first link. A third link is taken and the stud of the third link is then pushed through perforation 25 of the second link and then through perforation 27 of the first link. The result is then as shown in FIGS. 4 to 6. It should be noted that the spacing apart of perforations 25 and 27 is such that when the stud of the third link is inserted through the perforation 25 of the second link and the perforation 27 of the first link the shank of the stud abuts against end 31 of said perforation 25 and against end 33 of perforation 27. Accordingly, the three links are then held together fairly rigidly against the longitudinal movement of any of the studs relative to each other.

A further link may be added to the arrangement shown in FIGS. 4 to 6 simply by pushing the head of the stud of the further link through perforations 35 and 37. The length of the belt may be increased to any desired length simply by adding links in this way.

Figure 7:
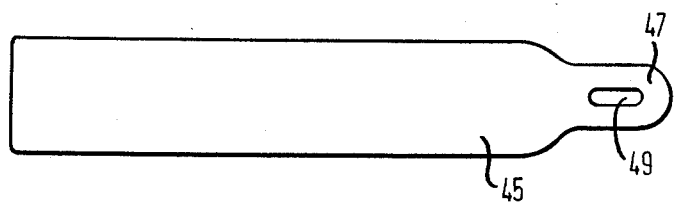
FIG. 7 is a plan view of a tool which may be used in connection with belting of the present invention.

FIG. 4 shows the three links after the head of the stud of the third link has been pushed through the perforations in the first two links. Accordingly the head of the stud 39 is shown aligned longitudinally relative to the links. In order to "lock" the links together, it is necessary to rotate the stud through 90° so that the stud head 39 lies in a similar orientation to stud head 41 of the second link and stud head 43 of the first link. This may be achieved by means of a simple tool such as that shown in FIG. 7. The tool 45 comprises a strip of metal having a narrowed end 47, the end 47 having located therein a perforation 49 which is of the same shape and dimensions as the perforations in the links. Accordingly, the perforation 49 may be located around stud head 39 and a small force applied to the tool will rotate the stud to 90° against the frictional forces between the material of the third link and shank stud.

In order to disassemble the three link arrangement referred to above, it is merely necessary to rotate the stud heads 39 and 41 to the orientation of stud head 39 as shown in FIG. 4. The end 47 of tool 45 is then inserted between the first and second links at a location between the studs of the second and third links. Levering of the tool will then cause the first link to lift over stud head 41. The first link can then be pulled over the stud head 39. The second link is then separated from the third link simply by drawing stud head 39 through the appropriate perforation of the second link.

Simple operations similar to those described above enable one or more links to be inserted or extracted from a continuous driving belt formed of such links.

Figure 2:
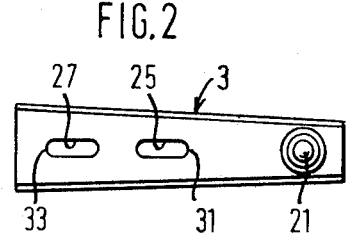
FIG. 2 is a top plan view of the link of FIG. 1.

The corresponding operations for current link belting, for instance belting composed of three layers of links such as those shown in FIGS. 1 and 2 of patent specification No. 340,065, are much more difficult to perform than with belting of the present invention. It is necessary to use a tool in order to stretch the particular link laterally between the studs of the other links to which it is attached and then the movement of pulling the link over the first of these studs requires rather considerable manual dexterity. By contrast, substantially no skill is required in the case of belting of the present invention, and this is a considerable advantage for users of the belting.

I claim:

1. A driving belt comprising detachable, flexible, elongate links arranged in a staggered, overlapping relationship, each link having a pendant stud including a shank with one end connected to the link for rotation with respect thereto and also including a head on the other end of the shank, first and second perforations in each link spaced from the stud thereof and from each other along the longitudinal axis of the link, each link having a solid cross section between the first and second perforations thereof, the first perforation of each link being located between the stud thereof and the second perforation thereof, each perforation having an elongated shape along the length of the associated link and having opposite ends, a first link being attached to a second, adjacent, overlapping link and to a third link overlapping adjacent said second link by the stud of the first link extending through the first perforation of the second link and through the second perforation of the third link, the head of each stud being shaped to allow the stud head to pass through the elongated perforations without substantial lateral distortion of each perforation only upon alignment thereof, the stud of each link being rotatable between a position where the head thereof is aligned with the perforations of the link and a position where the stud head is not so aligned, the shank of the stud of the first link passing through the first elongated perforation of the second link and being engaged by the end thereof closer to the stud of said second link, and the shank of the stud of the first link also passing through the second elongated perforation of the third link and being engaged by the end thereof remote from the stud of said second link, whereby the belt is rigid along its length.

2. A driving belt according to claim 1 wherein each link is made of solid woven polyester impregnated with polyurethane.

3. A driving belt according to claim 1 wherein the ends of each link are of different widths.

4. A driving belt according to claim 3 wherein the stud is attached to its associated link at the narrower link end.

5. A driving belt according to claims 1 or 4 wherein the sides of said link taper toward each other in a direction away from the head of its associated stud.

6. A driving belt comprising detachable, flexible, elongate links arranged in a staggered, overlapping relationship, each link having a tapered shape including wider and narrower ends, each link having a pendant stud including a shank with one end connected to the narrower end of the link for rotation with respect thereto and also including a head on the other end of the shank, first and second perforations in each link spaced from the stud thereof and from each other along the longitudinal axis of the link, each link having a solid cross section between the first and second perforations thereof, each perforation having an elongated shape along the length of the link, the first perforation of each link being located between the stud thereof and the second perforation thereof, a first link being attached to a second, adjacent, overlapping link and to third link overlapping adjacent said second link by the stud of the first link extending through the first perforation of the second link and through the second perforation of the third link, the head of each stud being oblong so as to allow the stud head to pass through the associated perforations without substantial lateral distortion of the links only when aligned with the associated perforations, the stud of each link being rotatable between a position where the head thereof is aligned with the associated link perforations and a position where the stud head is not so aligned, the shank of the stud of the first link passing through the first perforation of the second link at a position abutting the end thereof closer to the stud of said second link and through the second perforation of the third link at a position abutting the end thereof remote from the stud of said second link, whereby the belt is rigid along its length.

7. A driving belt according to claim 6 wherein the sides of said link taper toward each other in a direction away from the head of its associated stud.

8. A driving belt according to claim 6 wherein each link is made of solid woven polyester impregnated with polyurethane.

* * * * *